US012130824B2

(12) United States Patent
Kandpal et al.

(10) Patent No.: US 12,130,824 B2
(45) Date of Patent: Oct. 29, 2024

(54) PRECISION OF CONTENT MATCHING SYSTEMS AT A PLATFORM

(71) Applicant: Google LLC, Mountain View, CA (US)

(72) Inventors: Mayank Kandpal, Zürich (CH); Jakub Kúdela, Zürich (CH); Roman Vorushin, Zürich (CH)

(73) Assignee: Google LLC, Mountain View, CA (US)

(*) Notice: Subject to any disclaimer, the term of this patent is extended or adjusted under 35 U.S.C. 154(b) by 167 days.

(21) Appl. No.: 17/842,439

(22) Filed: Jun. 16, 2022

(65) Prior Publication Data

US 2023/0409582 A1 Dec. 21, 2023

(51) Int. Cl.
*G06F 16/24* (2019.01)
*G06F 16/2457* (2019.01)
*G06F 16/9535* (2019.01)

(52) U.S. Cl.
CPC .... *G06F 16/24578* (2019.01); *G06F 16/9535* (2019.01)

(58) Field of Classification Search
CPC ............ G06F 16/24578; G06F 16/9535
See application file for complete search history.

(56) References Cited

U.S. PATENT DOCUMENTS

2016/0092959 A1* 3/2016 Gross ................ G06Q 30/0625
705/26.62

* cited by examiner

*Primary Examiner* — Truong V Vo
(74) *Attorney, Agent, or Firm* — Lowenstein Sandler LLP

(57) ABSTRACT

Methods and systems for improving precision of content matching systems at a platform are provided herein. Candidate matches for a media item are obtained. Each of the candidate matches indicates a reference media item including content that corresponds to content of the media item. Similarity data associated with the media item and the reference media items of the candidate matches is provided as input to a machine learning model. A determination is made, based on outputs of the model, of a content category associated with the media item and whether content of the media item matches content of a respective reference media item of the candidate matches in view of the determined content category. If so, action is taken to prevent users from the platform from accessing the content of the media item.

20 Claims, 9 Drawing Sheets

PRECISION OF CONTENT MATCHING SYSTEMS AT A PLATFORM

TECHNICAL FIELD

Aspects and implementations of the present disclosure relate to improving precision of content matching systems at a platform.

BACKGROUND

A platform can allow users to connect and share information with each other. Some platforms (e.g., content sharing platforms) can allow users to upload, view, and share content, such as video items, image items, audio items, and so on (collectively referred to as media items herein). The shared content can include content from professional content creators (e.g., movie clips, TV clips, and music video items), as well as content from amateur content creators (e.g., video blogging and short original video items). Such content creators may wish to prevent other users from uploading content matching the content of the content creators' media items or impose other limitations on the use of the matching media items on the platform.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a method is disclosed for improving precision of content matching systems at a platform. The method includes obtaining a set of candidate matches for a media item of a platform. Each of the set of candidate matches indicates a reference media item including a content segment that corresponds to at least one content segment of the media item. The method further includes providing similarity data associated with the media item and each reference media item indicated by the set of candidate matches as input to a machine learning model. The method further includes obtaining one or more outputs of the machine learning model. The one or more outputs indicate one or more content categories and, for each content category, a first level of confidence that the media item is associated with the content category, and a second level of confidence that the at least one content segment of the media item matches content of a respective reference media item indicated by the set of candidate matches in view of the content category. The method further includes determining, based on the one or more obtained outputs a content category associated with the media item, and whether the at least one content segment of the media item matches the content of the respective reference media item indicated by the set of candidate matches in view of the determined content category. The method further includes, responsive to determining that the at least one content segment of the media item matches the content of the respective referenced media item indicated by the set of candidate matches in view of the determined content category, causing one or more actions to be initiated to prevent one or more users of the platform from accessing the at least one content segment of the media item.

In some implementations, a system is disclosed. The system includes a memory device and a processing device coupled to the memory device. The processing device is to perform operations including generating training data for a machine learning model. Generating the training data includes identifying a historical media item and one or more historical reference media items of a platform. Generating the training data further includes determining a content category associated with the historical media item. Generating the training data further includes obtaining historical similarity data associated with the historical media item and each of the one or more historical reference media items. Generating the training data further includes generating a training input including an indication of the historical media item, an indication of the one or more historical reference media items, and the obtained historical similarity data. Generating the training data further includes generating a target output including the content category associated with the historical media item and an indication of whether content of the historical media item matches content of the one or more historical reference media items. The system is to perform operations further including providing the training data to train the machine learning model to predict, based on given similarity data for a current media item and one or more current reference media items at the platform, content of the current media item that matches content of the one or more current referenced media items in view of a content category associated with the current media item. The machine learning model is trained on a set of training inputs including the training input, and a set of target outputs including the target output.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
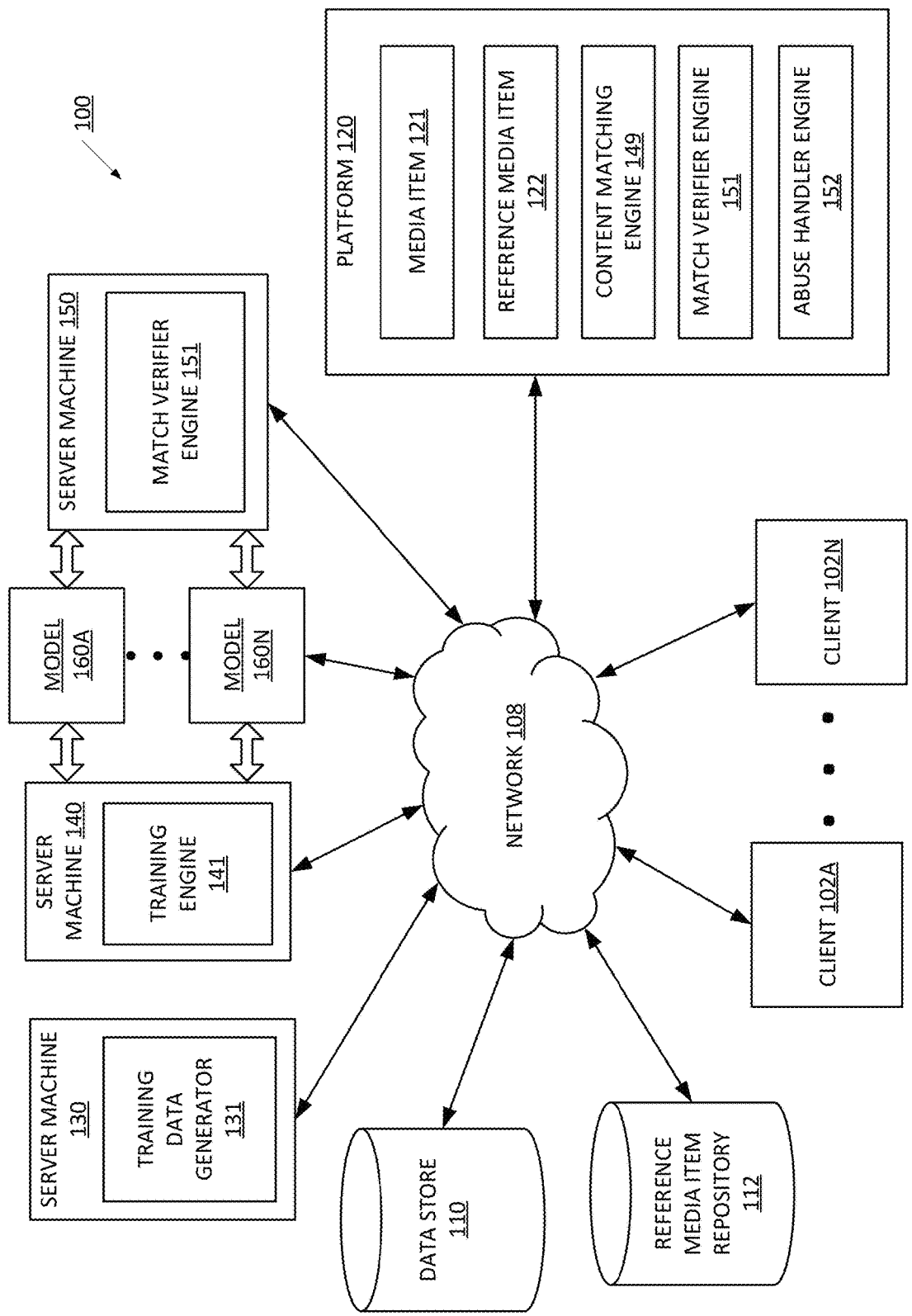
FIG. 1 illustrates an example system architecture, in accordance with implementations of the present disclosure.

Aspects of the present disclosure relate to improving precision of content matching systems at a platform. A platform (e.g., a content platform, etc.) can enable users to share media items (e.g., a video item, an audio item, etc.) with other users of the platform. For example, a media item owner (e.g., a professional content creator, an amateur content creator) may provide a media item for access by users of a platform. The media item owner may wish to prevent other users from uploading media items that match the content of the media owner's media item and/or impose other limitations on the use of matching media items on the platform.

The platform can compare features of a media item provided by a user of the platform (referred to herein as a user media item or a probe media item) to features of a media item provided by a media item owner (referred to herein as a reference media item) to determine whether content of the user media item matches content of the reference media item. The features of a media item can include spectral features, temporal features and/or structural features. The features can be specific to the media item and, in some instances, can correspond to a fingerprint (e.g., a digital fingerprint) for the media item. In some instances, the platform can provide feature data for a media item as input to one or more machine learning models that are trained to predict, in view of given feature data, whether features of the media item match features of one or more reference media items. Outputs of the one or more machine learning models can indicate one or more reference media items having feature data that corresponds to (e.g., matches or approximately matches) feature data for the user media item. The platform can identify, from the outputs of the one or more machine learning models, a reference media item having feature data that most closely matches the feature data for the media item and can determine whether a degree of matching between the feature data exceeds a threshold value. If so, the platform can determine that at least a portion of the content of the user media item matches content of the reference media item, which can indicate copyright abuse, in some instances. The platform can prevent such media item from being accessible by other users of the platform, in some instances. In other instances, the platform can transmit a notification to the media owner of the reference media item indicating the match. The media owner can indicate to the platform (e.g., via a client device) one or more actions to be taken with respect to the user media item, in some instances.

Certain types of user media items can include content that is more likely to be determined to match content of reference media items, even though such user media items do not actually include matching content that should qualify as copyright abuse. For example, a media owner can provide, to the platform, a reference media item including a video depicting gameplay (e.g., by the media owner) of a video game. Another user of the platform can provide another media item including a video depicting gameplay (e.g., by that user) of the same video game. As a video game may provide a common environment, common objects, common characters, etc. (collectively referred to herein as a common context) for players to interact with, content of the user media item may appear to be similar to the content of the reference media item. Accordingly, the platform may detect a high degree of matching between the features of the user media item and the features of the reference media item and may falsely determine (e.g., using the machine learning model(s) described above) that content of the media item matches the content of the reference media item. The platform may therefore flag the user media item for potential copyright abuse. However, the user media item may not actually qualify as copyright abuse, as the user media item depicts the gameplay of the other user rather than the gameplay of the media owner.

As indicated above, the platform may falsely identify particular types of user media items (e.g., common context media items) as matches to reference media items and may flag such user media items for copyright abuse. Such user media items can be removed from the content sharing platform and/or action may be taken against a user account associated with the user media item (e.g., the user account can be temporarily or permanently prohibited from providing and/or accessing media items, etc.). Flagging user media items for copyright abuse and taking action against media items (and/or user accounts associated with such media items) can consume a significant amount of computing resources. A high number of common context media items can be falsely flagged for copyright abuse and the platform can unjustifiably take action against such media items (and/or user accounts), therefore consuming a large amount of computing resources. Such computing resources may be unavailable to other processes associated with the platform, which can decrease an overall efficiency and increase an overall latency for the platform and/or client devices connected to the platform. In addition, such unjustifiable actions can result in users losing trust in the platform's operations, leading to fewer users providing common context media items to the platform and therefore a fewer amount of such media items can be available for consumption by other users of the platform.

Aspects of the present disclosure address the above and other deficiencies by improving precision of content matching systems at a platform. A platform can identify a media item that is to be provided for access to one or more users of the platform. In some embodiments, the platform can identify the media item in response to a request to make the media item available to the one or more users. Such media item is referred to herein as a user media item or a probe media item. The platform can obtain a set of candidate matches for the media item. The set of candidate matches can indicate one or more reference media items that include a content segment that corresponds to (e.g., matches or approximately matches) at least one content segment of the media item. In some embodiments, the platform can determine or otherwise obtain feature data associated with the media item. Feature data can include spectral feature data, temporal feature data, and/or structural feature data, in some embodiments. The platform can provide the feature data associated with the media item as input to a machine learning model that is trained to predict content of the media item that corresponds to (e.g., matches or approximately matches) content of one or more reference media items at the platform. Such machine learning model is referred to herein as a content match machine learning model or simply a content match model. A reference media item is provided by a media item owner (e.g., an owner of a copyright associated with the media item). In some embodiments, the platform has verified that the owner of the reference media item owns the rights to the media item (e.g., in accordance with a verification protocol of the platform). The platform can obtain one or more outputs of the machine learning model and can identify the set of candidate matches in view of the obtained one or more outputs. Further details regarding obtaining the set of candidate matches and the content match model are provided herein.

Responsive to obtaining the set of candidate matches, the platform can obtain similarity data that indicates a similarity between one or more features (e.g., spectral features, temporal features, structural features, etc.) of content segments of the media item and one or more features of content segments of the reference media items indicated by the set of candidate matches. In some embodiments, the similarity data can correspond to a heat map, where each region of the heat map indicates a degree of similarity between a content segment of the media item and a content segment of a reference media item indicated by the set of candidate matches. The platform can generate or otherwise obtain the heat map based on feature data associated with each content segment of the user media item and each content segment of the reference media item. Further details regarding the heat map are provided with respect to FIG. 4 herein. The platform can provide the obtained similarity data as input to a machine learning model that is trained to predict, based on given similarity data for user media items and reference media items at the platform, content of the media items that matches content of the reference media items (e.g., such as to amount to copyright abuse) in view of content categories associated with the media items. Such machine learning model is referred to herein as a candidate match verifier machine learning model or simply a match verifier model herein. Further details regarding the match verifier model and training the match verifier model are provided herein.

The platform can obtain one or more outputs of the match verifier model. The one or more outputs can indicate one or more content categories and, for each content category, a first level of confidence that the media item is associated with the content category (e.g., in view of patterns of the similarity data for the media item) and a second level of confidence that the at least one content segment of the media item matches content of a respective reference media item indicated by the set of candidate matches in view of the content category. The platform can determine, based on the one or more obtained outputs, a content category associated with the user media item (e.g., by determining that a first level of confidence for the content category satisfies a first confidence criterion) and whether the at least one content segment of the user media item matches content of a respective reference media item indicated by the set of candidate matches in view of the determined content category (e.g., by determining that a second level of confidence for the content category satisfies a second confidence criterion).

In response to determining that the at least one content segment of the user media item matches content of a respective reference media item, the platform can initiate an action to prevent one or more users from accessing the at least one content segment of the user media item. The action can include prohibiting the users from accessing the content segment(s), prohibiting the users from accessing the media item, transmitting a notification indicating the match to the media owner of the respective reference media item, and so forth. In response to determining that the content segment(s) does not match content of a respective reference media item, the platform can provide access to the media item, including the content segment(s), to users of the platform.

In an illustrative example, a user media item can include a video depicting gameplay of a video game. Such media item can be a common context media item and can therefore be more likely to include content that corresponds to reference media items that also depict gameplay of the video game, even though such content does not match content of the reference media items such as to amount to copyright abuse. The platform can obtain a set of candidate matches that indicate one or more reference media items that depict gameplay of the video game. In response to obtaining the set of candidate matches, the platform can provide similarity data for the user media item and the reference media items as input to the match verifier model and can obtain one or more outputs of the match verifier model. The platform can determine, based on the one or more outputs of the match verifier model, that a category of the user media item is a video gameplay media item and therefore the media item is a common context media item. The platform can also determine, based on the one or more outputs of the match verifier model, whether the content of the user media item matches the content of one or more reference media items indicated by the set of candidate matches. Since the media item is determined to be a common context media item, the platform can determine whether the content of the user media item matches content of a reference media item by determining whether a degree of matching between the content of the media item exceeds a higher threshold value than would be considered for user media items associated with a difference content category.

As indicated above, aspects of the present disclosure cover techniques to improve a precision of content matching systems at a platform by verifying whether content of user media items matches reference media items in view of a content category of the media items. As indicated above, user media items associated with particular content categories (e.g., common context media items, etc.) are more likely to have content that corresponds to content of reference media items (e.g., as indicated by a set of candidate matches determined from one or more outputs of a content match model). Embodiments of the present disclosure enable the platform to verify, in view of outputs of the match verifier model, whether content of a user media item associated with such content categories matches content of a reference media item such as to amount to copyright abuse or the reference media item is included in a set of candidate matches for the user media item solely in view of the common context between the media items. Accordingly, the platform is better able to identify user media items that include content that matches content of reference media items and can take appropriate action against such user media items. The platform, therefore, does not take action against user media items that are not verified matches (e.g., in view of output(s) of the match verifier model) and a larger amount of computing resources are made available to other processes associated with the platform. As a larger amount of computing resources is available to the other processes, an overall efficiency increases and an overall latency decreases. In addition, more users may provide common context media items to the platform, and a larger amount of such media items can be available for consumption by other users of the platform.

FIG. 1 illustrates an example system architecture 100, in accordance with implementations of the present disclosure. The system architecture 100 (also referred to as "system" herein) includes client devices 102A-N, a data store 110, a platform 120, and/or a server machine 150 each connected to a network 10. In implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. In some embodiments, a data item can correspond to one or more portions of a document and/or a file displayed via a graphical user interface (GUI) on a client device 102, in accordance with embodiments described herein. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 108.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Client devices 102A-N can include a content viewer. In some implementations, a content viewer can be an application that provides a user interface (UI) for users to view or upload content, such as images, video items, web pages, documents, etc. For example, the content viewer can be a web browser that can access, retrieve, present, and/or navigate content (e.g., web pages such as Hyper Text Markup Language (HTML) pages, digital media items, etc.) served by a web server. The content viewer can render, display, and/or present the content to a user. The content viewer can also include an embedded media player (e.g., a Flash® player or an HTML5 player) that is embedded in a web page (e.g., a web page that may provide information about a product sold by an online merchant). In another example, the content viewer can be a standalone application (e.g., a mobile application or app) that allows users to view digital media items (e.g., digital video items, digital images, electronic books, etc.). According to aspects of the disclosure, the content viewer can be a content platform application for users to record, edit, and/or upload content for sharing on platform 120. As such, the content viewers and/or the UI associated with the content viewer can be provided to client devices 102A-N by platform 120. In one example, the content viewers may be embedded media players that are embedded in web pages provided by the platform 120.

A media item 121 can be consumed via the Internet or via a mobile device application, such as a content viewer of client devices 102A-N. In some embodiments, a media item 121 can correspond to a media file (e.g., a video file, an audio file, a video stream, an audio stream, etc.). In other or similar embodiments, a media item 121 can correspond to a portion of a media file (e.g., a portion or a chunk of a video file, an audio file, etc.). As discussed previously, a media item 121 can be requested for presentation to the user by the user of the platform 120. As used herein, "media," "media item," "online media item," "digital media," "digital media item," "content," and "content item" can include an electronic file that can be executed or loaded using software, firmware or hardware configured to present the digital media item to an entity. As indicated above, the platform 120 can store the media items 121, or references to the media items 121, using the data store 110, in at least one implementation.

In another implementation, the platform 120 can store media item 121 or fingerprints as electronic files in one or more formats using data store 110. Platform 120 can provide media item 121 to a user associated with a client device 102A-N by allowing access to media item 121 (e.g., via a content platform application), transmitting the media item 121 to the client device 102, and/or presenting or permitting presentation of the media item 121 via client device 102.

In some embodiments, media item 121 can be a video item. A video item refers to a set of sequential video frames (e.g., image frames) representing a scene in motion. For example, a series of sequential video frames can be captured continuously or later reconstructed to produce animation. Video items can be provided in various formats including, but not limited to, analog, digital, two-dimensional and three-dimensional video. Further, video items can include movies, video clips, video streams, or any set of images (e.g., animated images, non-animated images, etc.) to be displayed in sequence. In some embodiments, a video item can be stored (e.g., at data store 110) as a video file that includes a video component and an audio component. The video component can include video data that corresponds to one or more sequential video frames of the video item. The audio component can include audio data that corresponds to the video data.

Platform 120 can include multiple channels (e.g., channels A through Z). A channel can include one or more media items 121 available from a common source or media items 121 having a common topic, theme, or substance. Media item 121 can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking," "following," "friending," and so on.

In some embodiments, system 100 can include one or more third party platforms (not shown). In some embodiments, a third party platform can provide other services associated media items 121. For example, a third party platform can include an advertisement platform that can provide video and/or audio advertisements. In another example, a third party platform can be a video streaming service provider that produces a media streaming service via a communication application for users to play videos, TV shows, video clips, audio, audio clips, and movies, on client devices 102 via the third party platform.

In some embodiments, a client device 102 can transmit a request to platform 120 for access to a media item 121. Platform 120 may identify the media item 121 of the request (e.g., at data store 110, etc.) and may provide access to the media item 121 via the UI of the content viewer provided by platform 120. In some embodiments, the requested media item 121 may have been generated by another client device 102 connected to platform 120. For example, client device 102A can generate a video item (e.g., via an audiovisual component, such as a camera, of client device 102A) and provide the generated video item to platform 120 (e.g., via network 108) to be accessible by other users of the platform. In other or similar embodiments, the requested media item 121 may have been generated using another device (e.g., that is separate or distinct from client device 102A) and transmitted to client device 102A (e.g., via a network, via a bus, etc.). Client device 102A can provide the video item to platform 120 (e.g., via network 108) to be accessible by other users of the platform, as described above. Another client device, such as client device 102N, can transmit the request to platform 120 (e.g., via network 108) to access the video item provided by client device 102A, in accordance with the previously provided examples.

In some embodiments, platform 120 can manage or otherwise have access to a reference media item repository 112. The reference media item repository 112 can include one or more data stores that store reference media items 122 associated with platform 120. As indicated above, a reference media item 122 is a media item that is provided to platform 120 by an owner (e.g., a copyright holder, etc.) of the media item. In some embodiments, platform 120 can add a reference media item 122 to the reference media item repository 112 in response to verifying that the user that provided the reference media item 122 is the media item owner (e.g., in accordance with one or more verification protocols of the platform 120). In some embodiments, data stores of reference media item repository 112 can be separate from data store 110 (e.g., as illustrated in FIG. 1). In other or similar embodiments, one or more data stores of reference media item repository 112 can be a part of data store 110.

As illustrated in FIG. 1, platform 120 can a content matching engine 149, a match verifier engine 151, and/or an abuse handler engine 152. Content matching engine 149, match verifier engine 151, and/or abuse handler engine 152 can be engines of a content matching system of platform 120. The content matching system can be configured to identify and take action against media items 121 including content that matches content of one or more reference media items 122 (e.g., such to amount to amount to copyright abuse), in accordance with embodiments described herein.

Content matching engine 149 (also referred to herein as content match engine 149) can be configured to identify one or more candidate matches associated with a media item 121 provided by a user of platform 120. As indicated above a user can provide (e.g., using client device 102) a media item 121 for access by other users of platform 120. In response to receiving the user media item 121 from the client device 102, content matching engine 149 can generate or otherwise obtain (e.g., at data store 110) feature data associated with content of the user media item 121. Feature data can include data associated with one or more spectral features, one or more temporal features, and/or one or more structural features for content of a media item 121. For example, the feature data can include a spatial resolution associated with one or more content segments of a media item 121, a frame rate associated with one or more content segments of media item 121, a motion activity associated with one or more content segments of media item 121, an amount of noise (e.g., image noise, audio noise, etc.) associated with one or more content segments of media item 121, an image texture complexity associated with one or more content segments of media item 121, a spatial complexity associated with one or more content segments of media item 121, and so forth. In some embodiments, feature data for content of a media item 121 can correspond to a digital fingerprint for the media item 121.

Content matching engine 149 can provide the feature data for a user media item 121 as input to a content matching machine learning model (referred to herein as content match model). The content match model can be trained to predict, based on given feature data for a media item 121, one or more reference media items 122 including content that corresponds to content of media item 121. Content matching engine 149 can obtain one or more outputs of the content match model and can determine, based on the one or more obtained outputs, a set of candidate matches associated with the user media item. Each of the set of candidate matches can indicate a reference media item 122 including content that corresponds to content of the user media item 121.

Match verifier engine 151 can be configured to verify whether content of reference media items 122 indicated by a set of candidate matches actually matches content of the user media items 121 such to amount to copyright abuse in view of a content category associated with the user media items 121. As indicated above, user media items 121 associated with particular content categories may be more likely to include content that corresponds to content of reference media items 122 associated with the same content category but may not include content that actually matches the content of the reference media items 122 such to amount to copyright abuse. For example, user media items 121 depicting gameplay of a video game may be more likely to be found to correspond to reference media items 121 depicting different gameplay of the same video game. In another example, user media items 121 including content segments that depict publically available templates may be more likely to be found to correspond to reference media items 121 depicting the same templates. In yet another example, user media items 121 depicting sporting events (e.g., soccer matches, football games, etc.) may be found to be more likely to correspond to reference media items 122 depicting the same sporting event (e.g., but recorded at a different angle, etc.). Such types of media items 121 are referred to herein as common context media items.

Match verifier engine 151 can generate or otherwise obtain similarity data indicating a similarity between features of the user media item 121 and features of each reference media item 122 indicated by the set of candidate matches. Similarity data can include a heat map associated with a user media item 121 and a respective reference media item 122, in some embodiments. Each region of a heat map can indicate a similarity of features associated with a content segment of the user media item 121 and a content segment of the respective reference media item 122. Further details regarding similarity data and heat maps are provided with respect to FIG. 4. Match verifier engine 151 can provide the similarity data as input to a match verifier machine learning model 160 (referred to as match verifier model 160 herein). Match verifier model 160 can be trained to predict, based on given similarity data for media items 121 and reference media items 122, content of media items 121 that matches content of reference media items 122 in view of content categories associated with the media items and reference media items. Further details regarding training and using match verifier model 160 are provided herein.

Training data generator 131 (i.e., residing at server machine 130) can generate training data to be used to train model 160. In some embodiments, training data generator 131 can generate the training data based on training media items (e.g., stored at data store 110 or another data store connected to system 100 via network 104). The training media items can include one or more user media items 121 and/or one or more reference media items 122. Data store 110 (or reference media item repository 112) can store metadata associated with the training media items. The metadata can include features data associated with the user media items 121 and/or the reference media items 122, in some embodiments. In some embodiments, match verifier machine learning model 160 can be a supervised machine learning model. In such embodiments, training data used to train model 160A can include a set of training inputs and a set of target outputs for the training inputs. The training inputs can include an indication of a training media item, an indication of one or more training reference media items, and/or historical similarity data associated with the training media item and the one or more training reference media items. The target outputs can include an indication of a content category associated with the historical media item and an indication of whether the content of the historical media item matches content of the one or more historical reference media items. Details regarding generating training data used to train model 160A are provided with respect to FIG. 5.

Server machine 140 may include a training engine 141. Training engine 141 can train a machine learning model 160A-N using the training data from training data generator 131. In some embodiments, the machine learning model 160A-N can refer to the model artifact that is created by the training engine 141 using the training data that includes training inputs and corresponding target outputs (correct answers for respective training inputs). The training engine 141 can find patterns in the training data that map the training input to the target output (the answer to be predicted), and provide the machine learning model 160A-N that captures these patterns. The machine learning model 160A-N can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. In other or similar embodiments, the machine learning model 160A-N can refer to the model artifact that is created by training engine 141 using training data that includes training inputs. Training engine 141 can find patterns in the training data, identify clusters of data that correspond to the identified patterns, and provide the machine learning model 160A-N that captures these patterns. Machine learning model 160A-N can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc. Further details regarding generating training data and training machine learning model 160 are provided with respect to FIG. 7.

Server 150 can include match verifier engine 151. As indicated above, match verifier engine 151 can be configured to verify whether content of reference media items 122 indicated by a set of candidate matches actually matches content of the user media item 121 such to amount to copyright abuse in view of a content category associated with the user media items 121. In response to providing similarity data for the user media item 121 and the reference media items 122 as input to match verifier model 160, match verifier engine 151 can obtain one or more outputs of the match verifier model 160. The one or more outputs can indicate one or more content categories and, for each content category, a first level of confidence that the content category corresponds to the user media item 121 and a second level of confidence that one or more content segments of the media item matches content of a respective reference media item 122 in view of the content category. Match verifier engine 151 can determine a content category associated with user media item 121 based on the one or more obtained outputs. Match verifier engine 151 can further determine whether the one or more content segments matches the content of a respective reference media item 122 in view of the determined content category based on the one or more outputs of the match verifier engine 151. Further details regarding determining a content category for a user media item 121 and determining whether content segments match content of a reference media item 122 in view of the determined content category are provided herein.

In response to match verifier engine 151 determining that one or more content segments of the user media item 121 matches content of a respective reference media item 122, abuse handler engine 152 can take one or more actions with respect to user media item 121. In some embodiments, abuse handler engine 152 can prevent the user media item 121 from being accessed by other users of platform 120. In other or similar embodiments, abuse handler engine 152 can prevent a content segment of user media item 121 that matches content of the reference media item 122 from being accessed by other users of platform 120. In yet other or similar embodiments, abuse handler engine 152 can transmit a notification to a client device 102 associated with the owner of the reference media item 122 indicating the match. The owner can provide an indication (e.g., via the client device 102) of an action that is to be taken against the user media item 121, in some embodiments. Abuse handler engine 152 can take additional or other types of actions against the user media item 121 and/or a user profile associated with the user media item 121, in some embodiments. In some embodiments, abuse handler engine 152 can determine an action to be taken in accordance with an abuse handling protocol of platform 120.

It should be noted that although FIG. 1 illustrates content matching engine 149, match verifier engine 151, and abuse handler engine 152 as part of platform 120, in additional or alternative embodiments, content matching engine 149, match verifier engine 151, and/or abuse handler engine 152 can reside on one or more server machines that are remote from platform 120 (e.g., server machine 150). It should be noted that in some other implementations, the functions of server machines 130, 140, 150 and/or platform 120 can be provided by a fewer number of machines. For example, in some implementations components and/or modules of any of server machines 130, 140, 150 may be integrated into a single machine, while in other implementations components and/or modules of any of server machines 130, 140, 150 may be integrated into multiple machines. In addition, in some implementations components and/or modules of any of server machines 130, 140, 150 may be integrated into platform 120.

In general, functions described in implementations as being performed by platform 120 and/or any of server machines 130, 140, 150 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of platform 120 and users of platform 120 accessing an electronic document, implementations can also be generally applied to any type of documents or files. Implementations of the disclosure are not limited to electronic document platforms that provide document creation, editing, and/or viewing tools to users. Further, implementations of the disclosure are not limited to text objects or drawing objects and can be applied to other types of objects.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
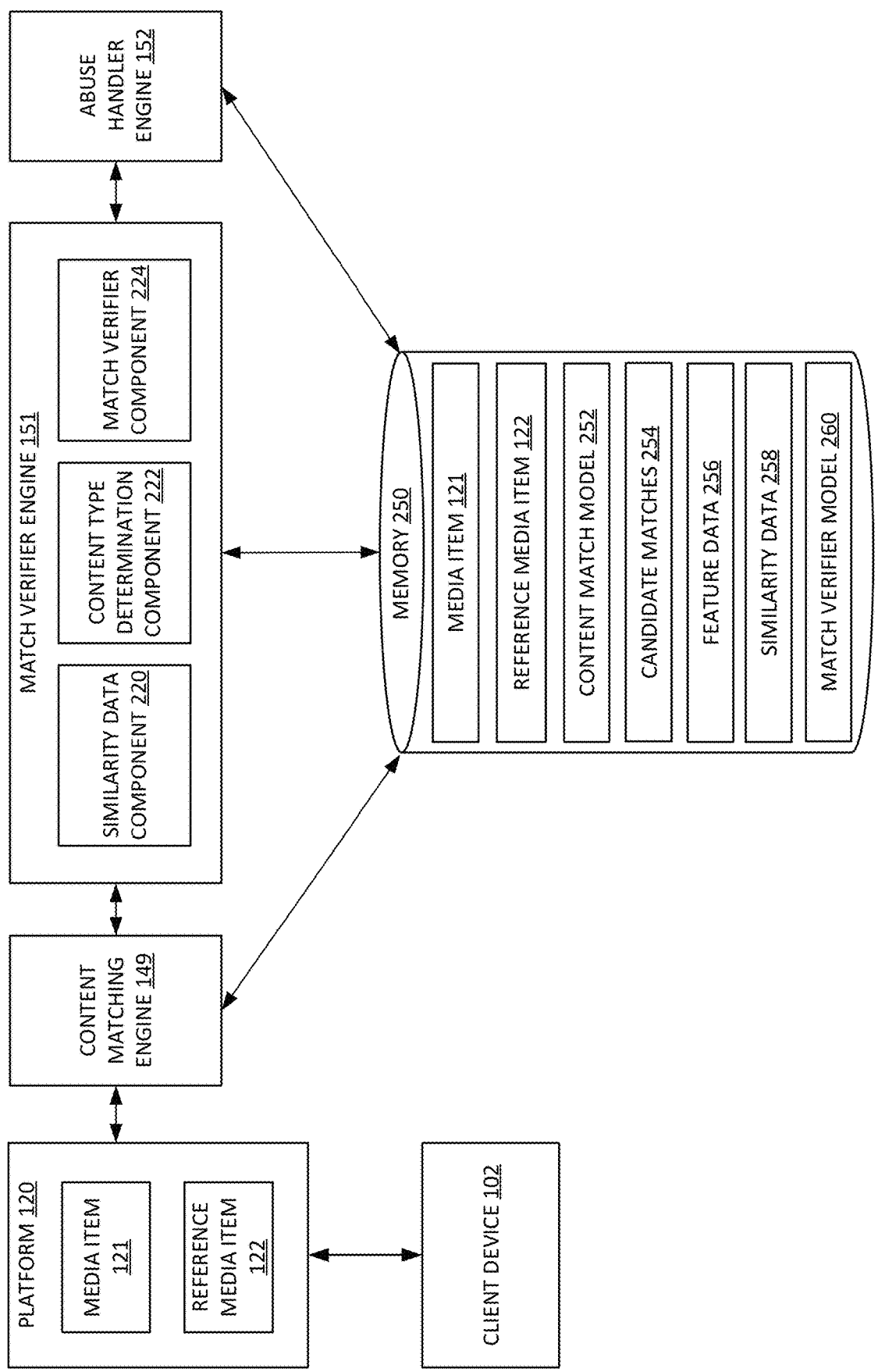
FIG. 2 is a block diagram illustrating an example platform, an example content matching engine, an example match verifier engine, and an example abuse handler engine, in accordance with implementations of the present disclosure.

FIG. 2 is a block diagram illustrating an example platform 120 and an example content matching engine 141, an example match verifier engine 151, and an example abuse handler engine 152, in accordance with implementations of the present disclosure. In some embodiments, platform 120, content matching engine 141, match verifier engine 151, and/or abuse handler engine 152 can be connected to memory 250. One or more portions of memory 250 can correspond to data store 110, reference media item repository 112, and/or another memory of system 100, in some embodiments. In additional or alternative embodiments, one or more portions of memory 250 can correspond to a memory of client device 102.

Figure 3A:
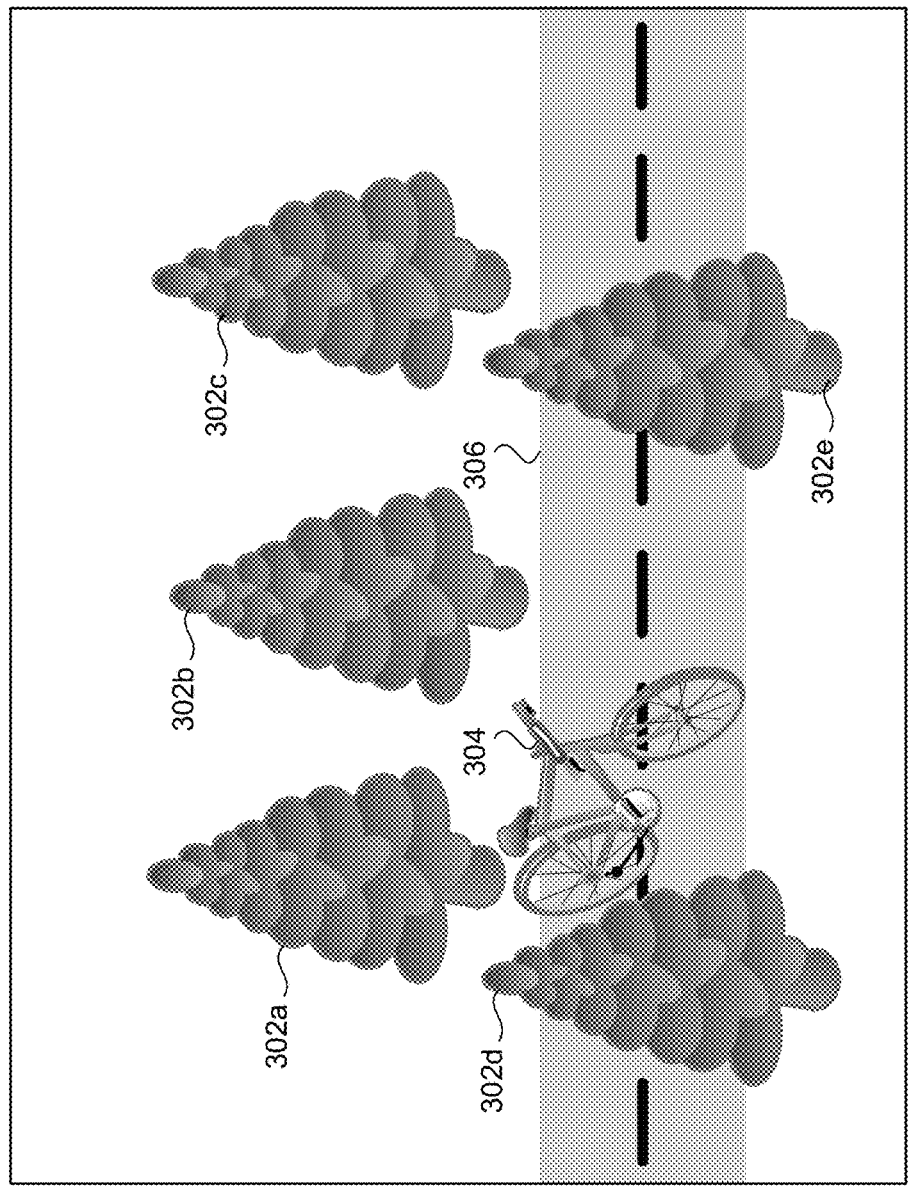
FIGS. 3A-3B illustrate example user media items and reference media items at a platform, in accordance with implementations of the present disclosure.

As described above, a user of client device 102 can provide a media item 121 for access by other users of platform 120. Such media item 121 is referred to as a user media item 121. FIG. 3A illustrates an example user media item 300, in accordance with implementations of the present disclosure. User media item 300 can correspond to a user media item 121 described with respect to FIG. 1. In an illustrative example, user media item 300 can include video content depicting a gameplay of a video game (e.g., a bicycle video game). The video content for user media item 300 may be generated while the user of client device 102 plays the video game (e.g., by engaging with UI elements or other elements of client device 102 or another device). The video game may be accessible to other users of platform 120 and therefore other users of platform 120 may play the video game. A context (e.g., an environment, objects, characters, etc.) of the video game that is depicted to users can be the same or similar for each user that accesses the video game. Accordingly, user media item v can be a common context media item.

As illustrated in FIG. 3A, an environment of the video gameplay of user media item 300 can include one or more tree elements 302 and a road element 306. A user can engage with control elements (e.g., buttons, a controller, a touch screen, etc.) of a device that depicts the elements 302, 306 to cause a bicycle element 304 to move within the environment. The environment of the video gameplay can change based on the user engagement with the control elements (e.g., the bicycle can move to another portion of the gaming map, etc.).

Figure 3B:
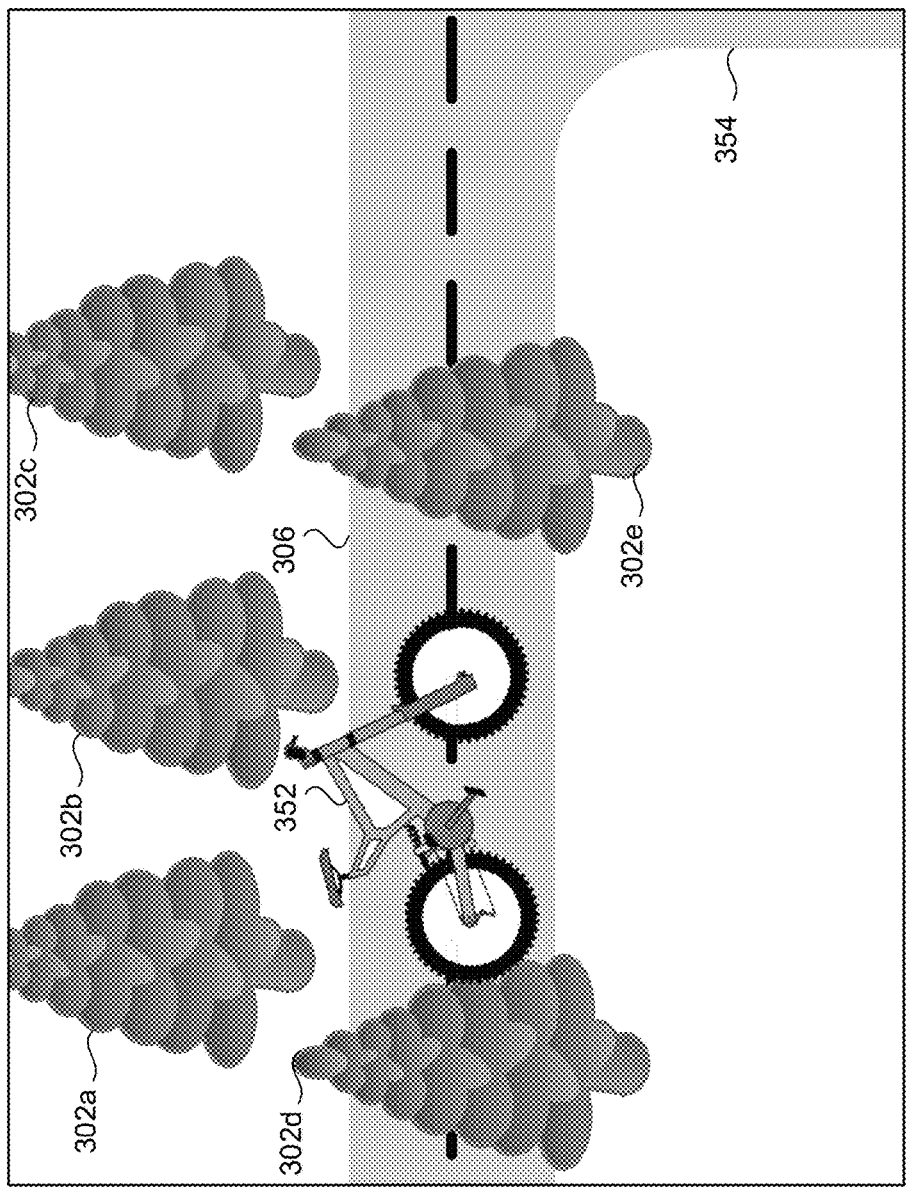

Referring back to FIG. 2, in response to receiving user media item 121, content matching engine 149 can determine whether content of user media item 121 corresponds to content of one or more reference media items 122 (e.g., at reference media item repository 122). FIG. 3B illustrates an example reference media item 350, in accordance with implementations of the present disclosure. Reference media item 350 can correspond to a reference media item 122 described with respect to FIG. 1. In an illustrative example, reference media item 350 can include video content depicting a different gameplay of the video game associated with user media item 300. The video content for reference media item 350 can be generated while an owner of reference media item 350 (or another player) plays the video game, as described above. As illustrated in FIG. 3B, an environment of the video gameplay of reference media item 350 can include one or more elements that are the same or similar to the elements depicted by the video content of user media item 300. For example, the environment of the video gameplay of reference media item 350 can include one or more tree elements 203 and a road element 306. In some embodiments, the video gameplay of reference media item 350 may depict a different bicycle element 352 than the bicycle element 304 of the video gameplay of user media item 300 (e.g., in view of user preferences or settings, etc.). Additionally or alternatively, the bicycle element 352 of the video gameplay of reference media item 350 can be located at a different region of the environment of the video game than the bicycle element 304 depicted by the video gameplay of user media item 300. For example, as illustrated in FIG. 3B, the bicycle element 352 of the video gameplay can be located at a portion of road element 306 that is near or adjacent an additional road element 354 (not depicted in the video gameplay of user media item 121). Accordingly, bicycle element 352 may be located at a different region of the video game map than bicycle element 304.

Referring back to FIG. 2, content matching engine 149 can obtain feature data 256 associated with user media item 121 and can provide the obtained feature data 256 as input to content match model 252. As indicated above, feature data 256 can include data indicating one or more spectral features, temporal features, or structural features of content of media item 121. As also indicated above, content match model 252 may be configured to predict, based on given feature data for a user media item, one or more reference media items that include content that corresponds to (e.g., matches or approximately matches) content of the user media item. Content matching engine 149 can obtain one or more outputs of content match model 252. In some embodiments, the one or more outputs of content match model 252 can include an indication of one or more reference media items 122 and, for each reference media item 122 and a degree of matching between the reference media item 122 and the user media item 121. Content matching engine 149 can identify one or more reference media items 122 having a degree of matching that satisfies a matching criterion. In some embodiments, a degree of matching for a reference media item 122 can satisfy the matching criterion of the degree of matching exceeds a degree of matching threshold and/or is larger than one or more other degrees of matching for other reference media items 122. In some embodiments, content matching engine 149 can identify a single reference media item 122 that satisfies the matching criterion. In other or similar embodiments, content matching engine 149 can identify multiple reference media items 122 that satisfy the matching criterion. Content matching engine 149 can include each reference media item 122 that is determined to satisfy the matching criterion in the set of candidate matches 254. In accordance with one or more examples of the present disclosure, content matching engine 149 can include reference media item 350 in the set of candidate matches 254 corresponding to user media item 300.

Figure 4:
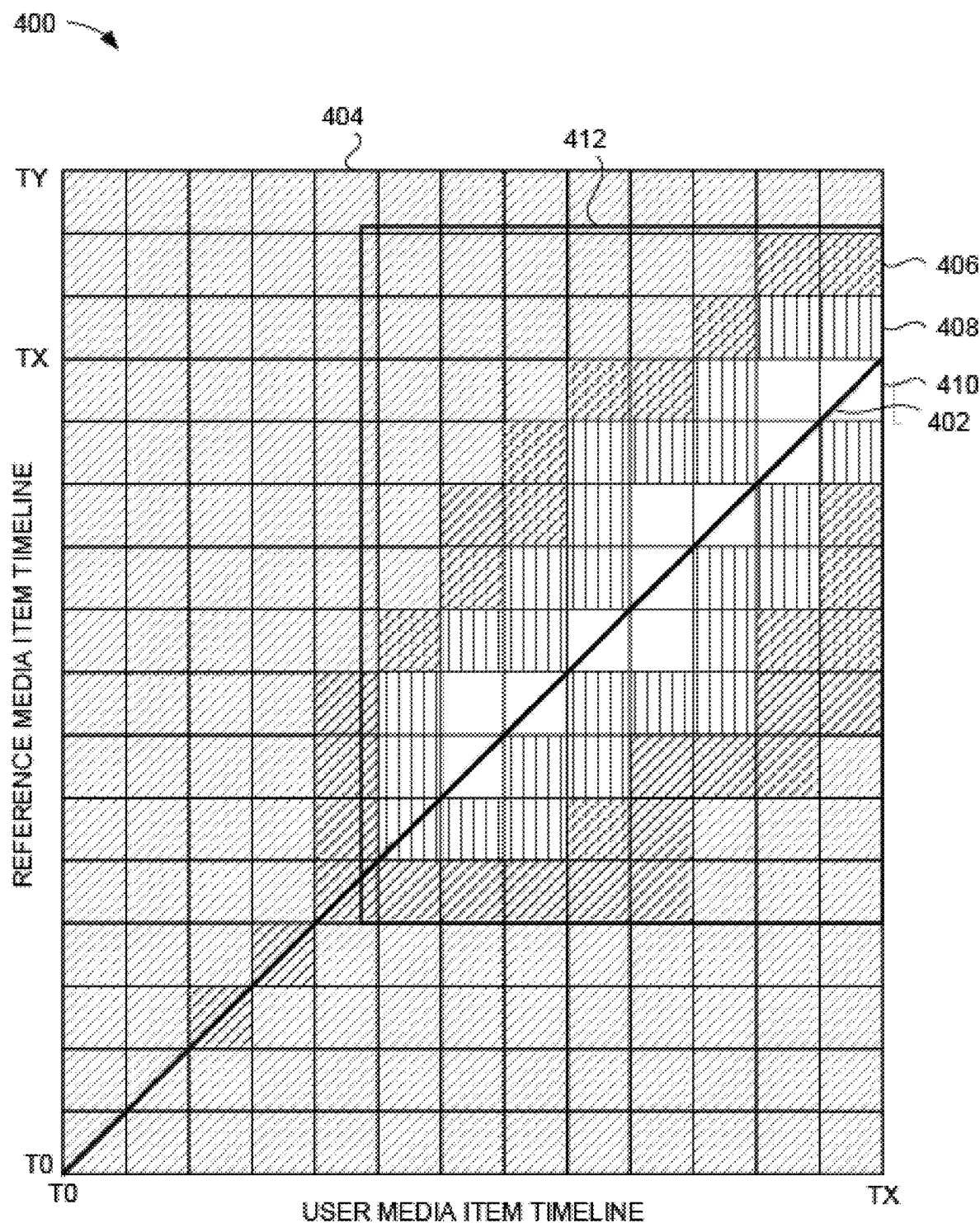
FIG. 4 illustrates example similarity data for a media item and a reference media item, in accordance with implementations of the present disclosure.

As indicated above, match verifier engine 151 can be configured to verify whether content of user media item 121 includes content that matches content of reference media items 122 indicated by the set of candidate matches 254 such to amount to copyright abuse. Similarity data component 520 of match verifier engine 151 can be configured to generate or otherwise obtain similarity data 258 for user media item 121 and each reference media item 122 indicated by the set of candidate matches 254. FIG. 4 illustrates example similarity data 400 for a user media item 121 and a reference media item 122, in accordance with implementations of the present disclosure. As described above, similarity data can include a heat map, in some embodiments. Regions of a heat map can indicate a similarity between features of a user media item 121 and features of a reference media item 121. For purposes of example and illustration only, similarity data 400 is also referred to herein as heat map 400.

As illustrated in FIG. 4, an x-axis of heat map 400 can correspond to a first timeline associated with user media item 121. Each time period of the first timeline can correspond to a respective content segment of user media item 121. A y-axis of heat map 400 can correspond to a second timeline associated with reference media item 122. Each time period of the second timeline can correspond to a respective content segment of reference media item 122. As illustrated in FIG. 4, a length of the first timeline can be different from a length of the second timeline. For example, the first timeline can have an initial time period of time T0 and a final time period of time TX. The second time line can have an initial time period of time T0 and a final time period of time TY.

A diagonal 402 of heat map 400 can indicate time periods of the first timeline that correspond to time periods of the second timeline, in some embodiments. For example, as illustrated in FIG. 4, the diagonal 402 of heat map 400 can indicate time periods including and between time periods T0 and TX of the first timeline and the second timeline.

As indicated above, each region of heat map 400 can indicate a similarity between features of a content segment of user media item 121 and features of a content segment of reference media item 122. Similarity data component 250 can determine the similarity between features of a content segment of user media item 121 and a content segment of reference media item 122 by determining a cosine difference between feature data for the content segment of user media item 121 and feature data for the content segment of reference media item 122. In an illustrative example, similarity data component 220 can obtain the feature data for a content segment of user media item 121 and the feature data for the content segment of reference media item 122, as described above. The feature data for such content segments can be represented by a digital fingerprint (e.g., a vector of one or more distinct floating point values, etc.) for each respective content segment. Similarity data component 250 can provide the digital fingerprints as input to a cosine difference function. A cosine difference function can be a function that determines a difference between two sequences (e.g., vectors) of numbers (e.g., floating point values). Similarity data component 250 can obtain one or more outputs of the cosine difference function which indicates a degree of similarity (or a degree of difference) between the input digital fingerprints. In an illustrative example, an output of the cosine difference function can be a value between 0 and 1, wherein 0 corresponds to a low degree of similarity (or a high degree of difference) between the content segments and 1 corresponds to a high degree of similarity (or a low degree of difference) between the content segments. It should be noted that similarity data component 220 can determine a similarity between the content segments of the user media item 121 and the reference media item 122 according to other techniques, in additional or alternative embodiments.

In some embodiments, each region of heat map 400 can include or otherwise be associated with a distinct color or pattern to indicate the similarity between the features of such content segments. Each distinct color or pattern can correspond to a level or degree (or range of levels or degrees) of similarity between the content segment features. In an illustrative example, regions 404 of heat map 400 for content segments having a lowest degree of similarity can be associated with a first color or pattern. Regions 406 of heat map 400 for content segments having a degree of similarity that is higher than the degree of similarity indicated by the first color or pattern of regions 404 can be associated with a second color or pattern. Regions 408 of heat map 400 for content segments having a degree of similarity that is higher than the degree of similarity indicated by the second color or pattern of regions 406 can be associated with a third color or pattern. Regions 410 of heat map 400 for content segments having highest degree of similarity can be associated with a fourth color or pattern. As illustrated in FIG. 4, regions located near or adjacent to the time periods of time TX of the first timeline and the second timeline are indicated to have the highest degree of similarity. Accordingly, content segments of the user media item 121 at or around the time periods of time TX of the first timeline more closely correspond to content segments of the reference media item 122 at or around the time periods of time TX of the second timeline than other content segments.

In some embodiments, similarity data component 220 can identify regions of heat map 400 that indicate a highest degree of similarity between content segments of user media item 121 and reference media item 122. Similarity data component 250 can identify such regions of heat map 400 in view of a number of regions associated with a higher degree of similarity than other regions of the heat map (e.g., a number of regions 410, 408, and/or 406), an average distance between regions that are associated with the higher degree of similarity (e.g., regions 410) and diagonal 402, a number of regions that are associated with a higher degree of similarity than other regions of the heat map (e.g., regions 410, 408, and/or 406) and are also adjacent to other regions that are associated with a lower degree of similarity than other regions of the heat map (e.g., regions 404), or metadata associated with diagonal 402 (e.g., a slope of diagonal 402, a length of diagonal 402, etc.). Such identified regions are indicated by box 412 of FIG. 4, in an illustrative example. A distribution of similar content segments within box 412 can correspond to a content category associated with a user media item 121 and/or a reference media item 122, in accordance with embodiments of the present disclosure.

Similarity data component 250 (or another component of match verifier engine 151) can provide similarity data for the identified regions of heat map 400 as input to match verifier model 260. As indicated above, match verifier model 260 can be trained to predict, based on given similarity data, content of media items that matches content of reference items in view of content categories associated with the media items and reference media items. One or more components of match verifier engine 151 can obtain one or more outputs of match verifier model 260. The one or more outputs can indicate one or more content categories and, for each content category, a first level of confidence that the content category corresponds to content of the user media item 121 (and/or the reference media item 122) and a second level of confidence that content of the user media item 121 matches content of the reference media item 122 in view of the content category.

Content type determination component 222 can determine a content category associated with the user media item 121 (and/or the reference media item 122) based on the one or more outputs of match verifier model 260. In some embodiments, content type determination component 524 can determine a content category associated with the user media item 121 by determining that the first level of confidence for the content category satisfies a first threshold criterion (e.g., exceeds a first threshold level of confidence). In an illustrative example, one or more outputs of match verifier model 260 can indicate that media item 300 may be associated with a video gameplay content type. A video gameplay content type may be a common context media item type, as described above. Content type determination component 222 can determine that media item 300 is associated with the video gameplay content type by determining that a first level of confidence for the video gameplay content type exceeds a first threshold level of confidence.

Match verifier component 224 can determine whether at least one content segment of the user media item 121 matches content of the reference media item 122 in view of the determined content category based on the one or more outputs. In some embodiments, match verifier component 224 can determine that the content segment matches content of the reference media item 122 in response to determining that the second level of confidence satisfies a second threshold criterion (e.g., exceeds a second threshold level of confidence). The second level of confidence can correspond to a degree of matching between the content segment of user media item 121 and reference media item 122, in some embodiments. In some embodiments, the second threshold level of confidence can be associated with a higher degree of matching than a degree of matching threshold evaluated by content matching engine 149. In additional or alternative embodiments, the second threshold level of confidence be associated with a degree of matching that corresponds to a particular content category for the user media item 121. In an illustrative example, the second threshold level of confidence for a common context media item may be associated with a higher degree of accuracy than a degree of accuracy for a non-common context media item. Match verifier component 224 can determine the second threshold level of confidence based on pre-defined data associated with the platform 120. The pre-defined data can be provided to platform 120 by a developer, an operator, an engineer, etc. for platform 120, in some embodiments.

In response to match verifier engine 151 determining that content of user media item 121 matches content of a reference media item 122, abuse handler engine 152 can initiate one or more actions with respect to user media item 121, a user profile associated with media item 121, and/or a client device associated with the user profile, as described above. In response to match verifier engine 151 determining that content of user media item 121 does not match content of a reference media item 121, abuse handler engine 152 can provide user media item 121 for access to one or more additional users of platform 120. In some embodiments, abuse handler engine 152 can provide user media item 121 for access to the one or more additional users by adding user media item 121 to a repository that includes media items 121 that are accessible to users.

Figure 5:
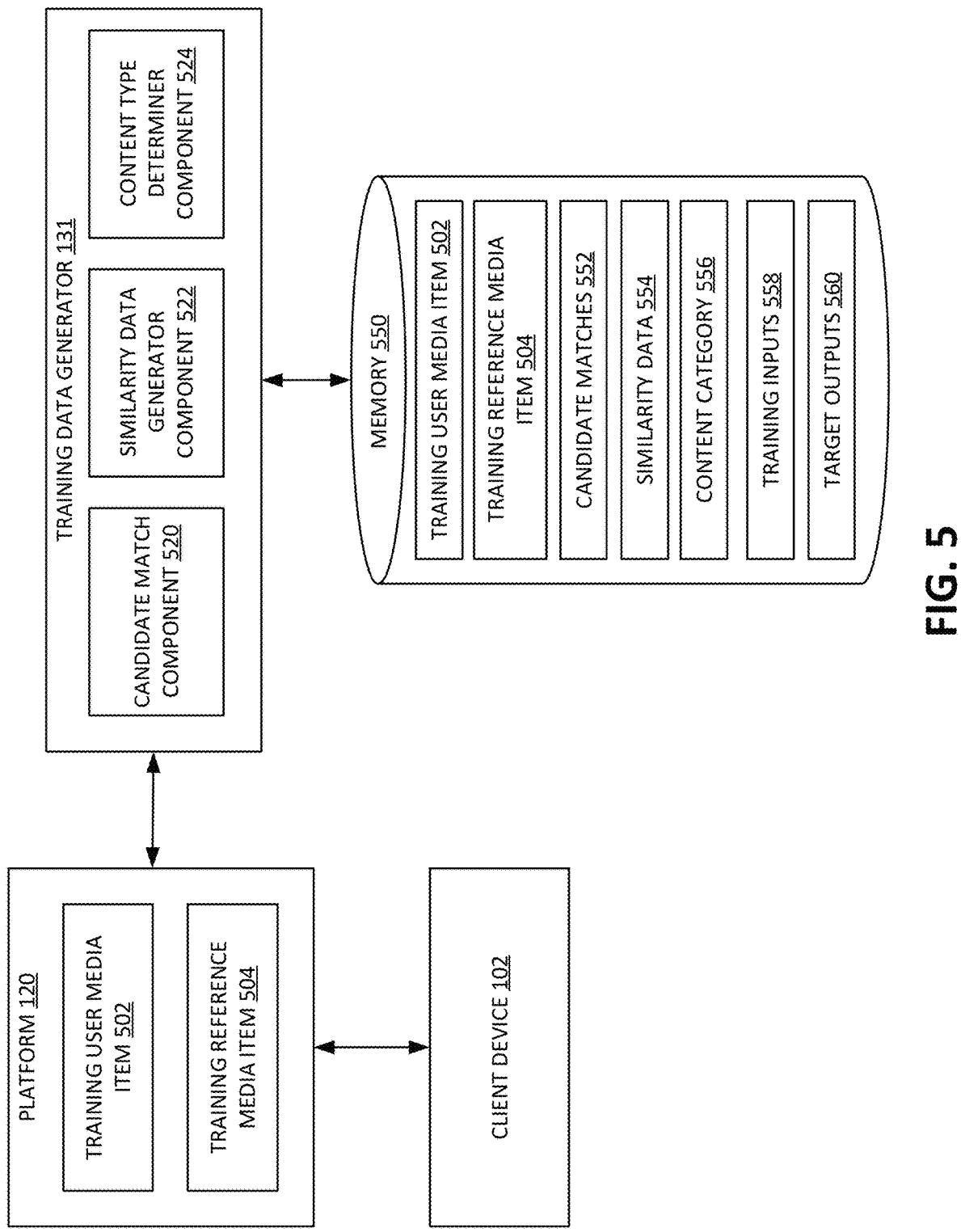
FIG. 5 is a block diagram illustrating an example platform and an example training data generator, in accordance with implementations of the present disclosure.

FIG. 5 is a block diagram illustrating an example platform 120 and an example training data generator 131, in accordance with implementations of the present disclosure. As described above, training data generator 131 can be configured to generate training data to train a machine learning model to predict, based on given similarity data, content of user media items 121 that matches content of reference media items 122 in view of a content category associated with the user media items 121 and/or the reference media items 122. In some embodiments, training data generator 131 is coupled to or otherwise has access to memory 550. Memory 550 can correspond to one or more regions of data store 110 and/or reference media item repository 112, in some embodiments. In other or similar embodiments, memory 550 can correspond to another region of memory of system architecture 100.

Training data generator 131 can generating the training data based on training media items. The training media items can include one or more training user media items 502 and/or one or more training reference media items 504. The training user media items 502 can be media items that were previously provided by a user of platform 120 for access by other users of the platform 120. Training user media items 502 are also referred to as historical user media items herein. The training reference media items 504 can be media items that were previously provided by a media item owner. Training reference media items 504 are also referred to as historical reference media items herein.

Training data generator 131 can identify a training user media item 502 at memory 550 (e.g., at data store 110), in some embodiments. In some embodiments, training data generator 131 can identify training reference media items 504 by obtaining a set of candidate matches 552 associated with training user media item 502. Candidate match component 520 of training data generator 131 can obtain the set of candidate matches 552 by providing feature data associated with the training user media item 502 as input to content match model 252 and identifying the set of candidate matches 552 based on one or more outputs of the content match model 252, in accordance with embodiments described herein. Candidate match component 520 can obtain the set of candidate matches 552 in accordance with other techniques, in additional or alternative embodiments. In response to obtaining the set of candidate matches 552, similarity data generator 522 of training data generator 131 can generate or otherwise obtain similarity data 554 associated with the training user media item 502 and each training reference media item 504 identified by the set of candidate matches 552. In some embodiments, similarity data generator 522 can generate the similarity data by generating a heat map for the training user media item 502 and each respective training reference media item 504, in accordance with embodiments described herein.

In some embodiments, similarity data generator 522 can extract one or more segments from the generated similarity data 554 to be used for training model 160. In an illustrative example, similarity data generator 522 can identify one or more regions of a heat map for a training media item 502 and training reference media item 504 that indicate a higher degree of similarity between one or more content segments of the training media item 502 and the training reference media item 504 than other regions of the heat map. Similarity data generator 522 can identify the one or more regions of the heat map in view of a number of regions associated with a higher degree of similarity than other regions of the heat map, an average distance between regions that are associated with the higher degree of similarity and a diagonal of the heat map (e.g., a region of the heat map that corresponds to sequential content segments on timelines of the training media item 121 and the training reference media item 122), a number of regions that are associated with a higher degree of similarity than other regions of the heat map and are adjacent to other regions that are associated with a lower degree of similarity than other regions of the heat map, or metadata associated with the diagonal of the heat map. Details regarding identifying such regions of the heat map are described with respect to FIG. 4 above. In response to identifying such regions of the heat map, similarity data generator 522 can extract data associated with the identified regions from the similarity data.

In some embodiments, content type determiner component 524 of training data generator 131 can determine a content category 556 associated with the training user media item 502 and each respective training reference media item 504. Content type determiner component 556 can determine the content category associated with the training media items 121 by providing the training media items 502, 504 as input to a content classifier engine (not shown), in some embodiments. The content classifier engine can be configured to parse a knowledge graph to identify a category of content associated with features that corresponds to the features of the training media items 502, 504. Content type determiner component 556 can determine the content category 556 for a training media items 502, 054 in view of one or more outputs of the content classifier engine. In other or similar embodiments, content type determiner component 556 can determine the content category associated with the training media items 502, 504 in view of information provided by one or more users (e.g., via client devices 102). In an illustrative example, content type determiner component 556 can provide one or more of training media items 502, 504 for presentation via a UI of client device 102. A user of client device 102 can provide (e.g., via the UI) an indication of a content category 556 associated with the training media items 502, 504, in some embodiments. Client device 102 can transmit an indication of the provided content category 556 to training data generator 131, in some embodiments. In other or similar embodiments, client device 102 can store an indication of the provided content category 556 at memory 550. Content type determiner component 556 can access memory 550 to identify the content category 556, in such embodiments.

Training data generator 131 can generate a training input 558 and a target output 560 for the training input 558 to be included with the training data. As indicated above, the training input 558 can include an indication of training user media item 502, an indication of one or more training reference media items 504 (e.g., indicated by the set of candidate matches 552), and one or more portions of the similarity data 554, as described above. The training output 560 can include an indication of the content category 556 associated with the training media item 502 and/or the one or more training reference media items 502 and an indication of whether content of the training user media item 502 matches content of the one or more training reference media items 504. In some embodiments, training data generator 131 may determine whether content of the training media item 502 matches the content of the training reference media items 504 in view of a user input (e.g., received form client device 102). Once training data generator 131 generates the training input 558 and the target output 560, training data generator 131 can provide the training data to training engine 141 to train match verifier model 160, in accordance with embodiments described herein.

Figure 6:
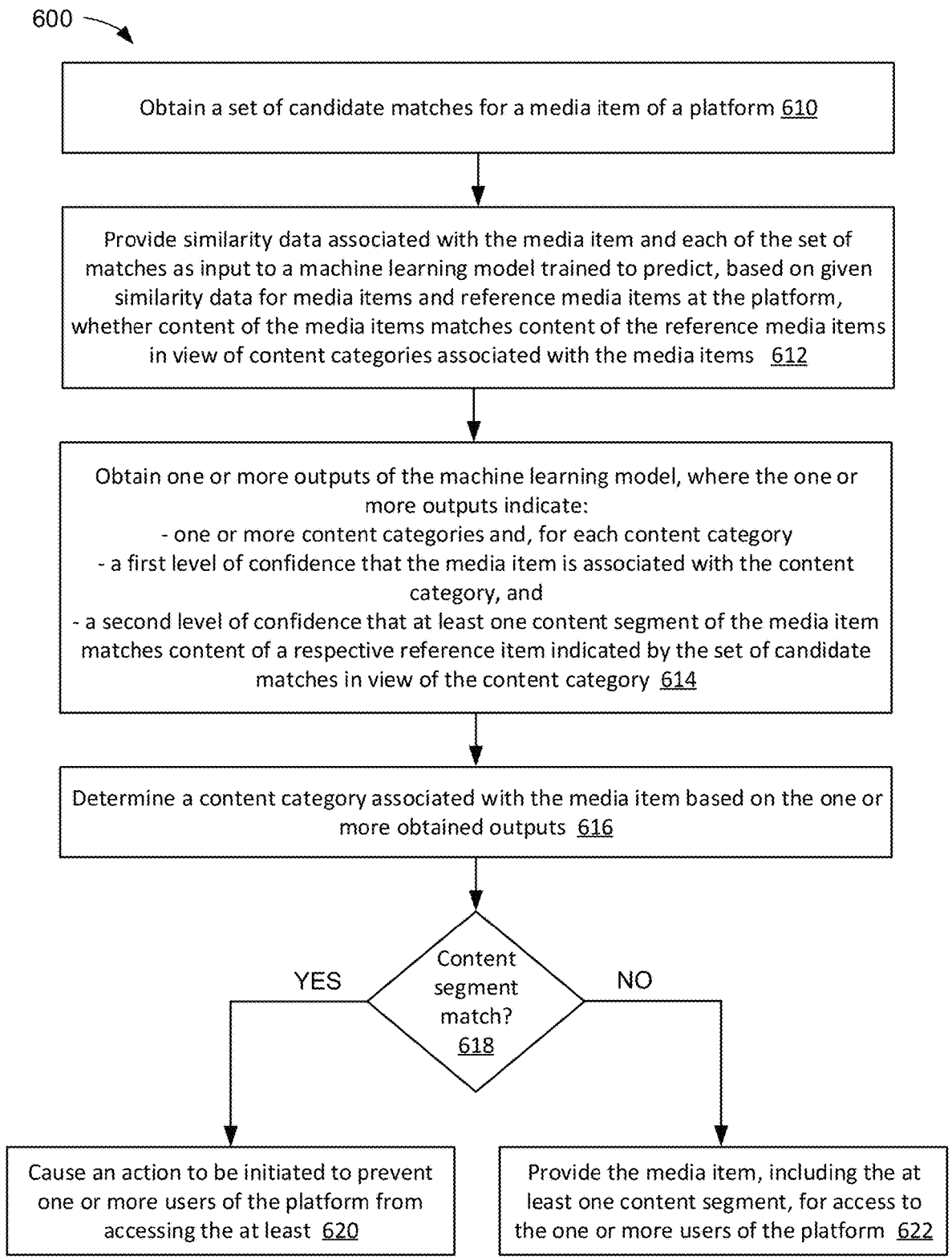
FIG. 6 depicts a flow diagram of an example method for improving precision of content matching systems at a platform using a match verifier model, in accordance with implementations of the present disclosure.

FIG. 6 depicts a flow diagram of an example method 600 for improving precision of content matching systems at a platform using a match verifier model, in accordance with implementations of the present disclosure. Method 600 can be performed by processing logic that can include hardware (circuitry, dedicated logic, etc.), software (e.g., instructions run on a processing device), or a combination thereof. In one implementation, some or all of the operations of method 600 can be performed by one or more components of system 100 of FIG. 1. In some embodiments, some or all of the operations of method 600 can be performed by match verifier engine 151 and/or abuse handler engine 152, as described above.

At block 610, process logic obtains a set of candidate matches for a media item at a platform. Each of the set of candidate matches can indicate a reference media item including a content segment that corresponds to at least one content segment of the media item. In some embodiments, the set of candidate matches can be obtained based on one or more outputs of content match model 252, as described herein.

At block 612, process logic provides similarity data associated with the media item and each of the set of candidate media items as input to a machine learning model (e.g. match verifier model 160). The similarity data can correspond to one or more regions of heat map 400, in some embodiments. The machine learning model can be trained to predict, based on given similarity data for media items and reference media items at the platform, content of the media items that matches content of the reference media items in view of content categories associated with the media items and the reference media items.

At block 614, process logic obtains one or more outputs of the machine learning model. The one or more outputs can indicate, one or more content categories and, for each content category, a first level of confidence that the media item is associated with the content category and a second level of confidence that the at least one content segment of the media item matches content of a respective media item indicated by the set of candidate matches in view of the content category.

At block 616, process logic determines, based on the one or more obtained outputs, a content category associated with the media item. At block 618, process logic determines whether the at least one content segment of the media item matches the content of the respective reference media item indicated by the set of candidate matches in view of the determined content category. In response to process logic determining that the at least one content segment of the media item matches the content of the reference media item, method 600 can proceed to block 620. At block 620, process logic can cause one or more actions to be initiated to prevent one or more users of the platform from accessing the at least one content segment of the media item. to process logic determining that the at least one content segment of the media item does not match the of the reference media item, method 600 can proceed to block 622. At block 622, process logic provides the media item, including the at least one content segment, for access to the one or more users of the platform.

Figure 7:
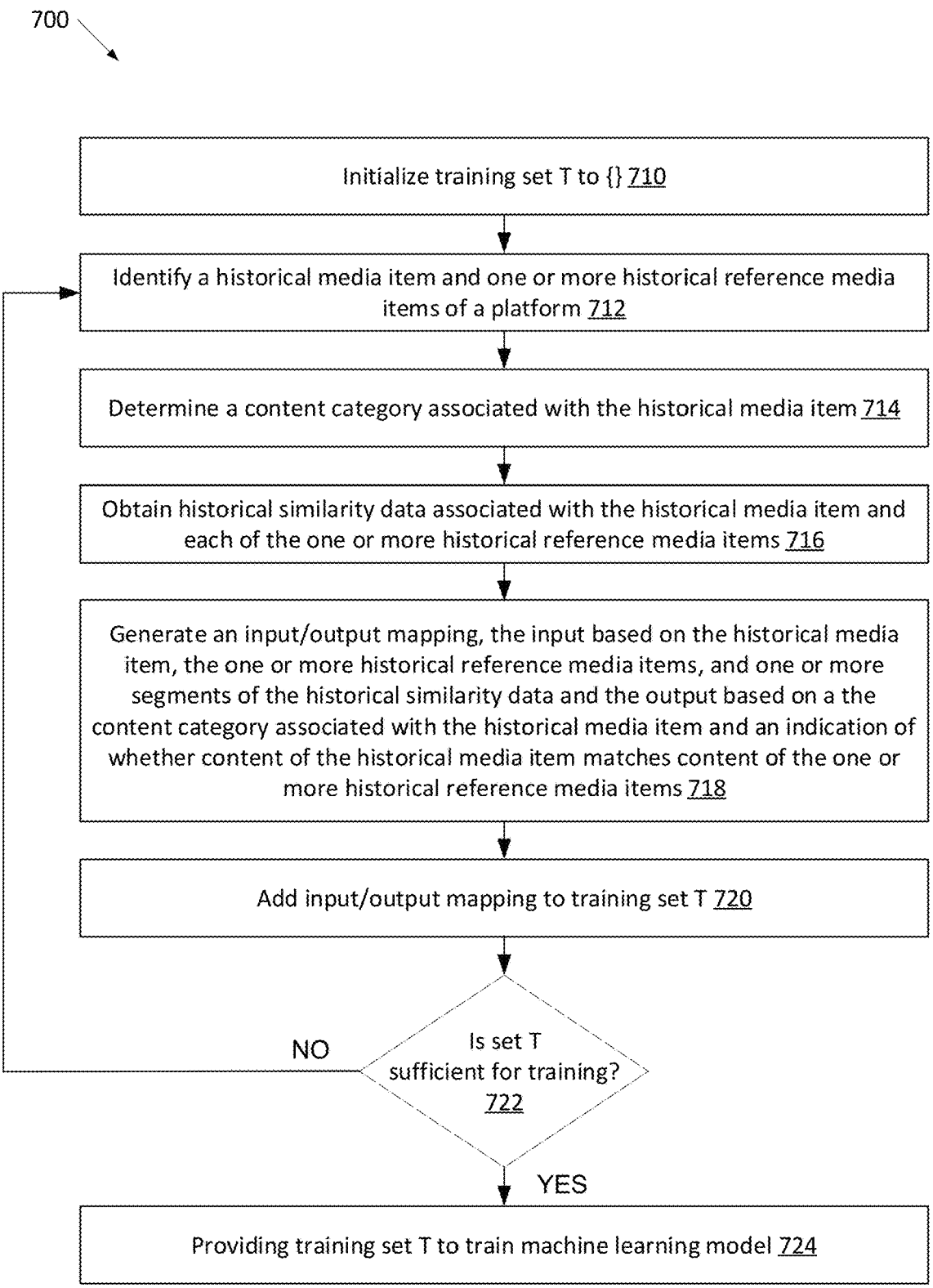
FIG. 7 depicts a flow diagram of an example method for training a match verifier model, in accordance with implementations of the present disclosure.

FIG. 7 depicts a flow diagram of an example method 700 for training a match verifier model, in accordance with implementations of the present disclosure. Method 700 can be performed by processing logic that can include hardware (circuitry, dedicated logic, etc.), software (e.g., instructions run on a processing device), or a combination thereof. In one implementation, some or all of the operations of method 700 can be performed by one or more components of system 100 of FIG. 1. In some embodiments, some or all of the operations of method 700 can be performed by training data generator 131 and/or training engine 141, as described above.

At block 710, processing logic initiates training set T to (e.g., to empty). At block 712, processing logic identifies a historical media item and one or more historical reference media items of a platform. In some embodiments, the historical media item can be a media item previously provided by a user of the platform. In additional or alternative embodiments, the one or more historical reference media items can be reference media items previously provided by media item owners of the platform.

At block 714, processing logic determines a content category associated with the historical media item. At block 716, processing logic obtains historical similarity data associated with the historical media item and each of the one or more historical reference media items. At block 718, processing logic generates an input/output mapping, the input based on the historical media item, the one or more historical reference media items, and one or more segments of the historical similarity data and the output based on a the content category associated with the historical media item and an indication of whether content of the historical media item matches content of the one or more historical reference media items. At block 720, processing logic adds the input/output mapping to training set T. At block 722, processing logic determines whether set T is sufficient for training. In response to processing logic determining that set T is not sufficient for training, method 700 can return to block 712. In response to processing logic determining that set T is sufficient for training, method 700 can proceed to block 724. At block 724, processing logic can provide training set T to train a machine learning model, such as machine learning model 160, as described above.

Once processing logic provides training set T to train the machine learning model, the machine learning model can predict, based on given similarity data for media items and reference media items at the platform, content of the media items that matches content of the reference media items in view of content categories associated with the media items and the reference media items, as described above.

Figure 8:
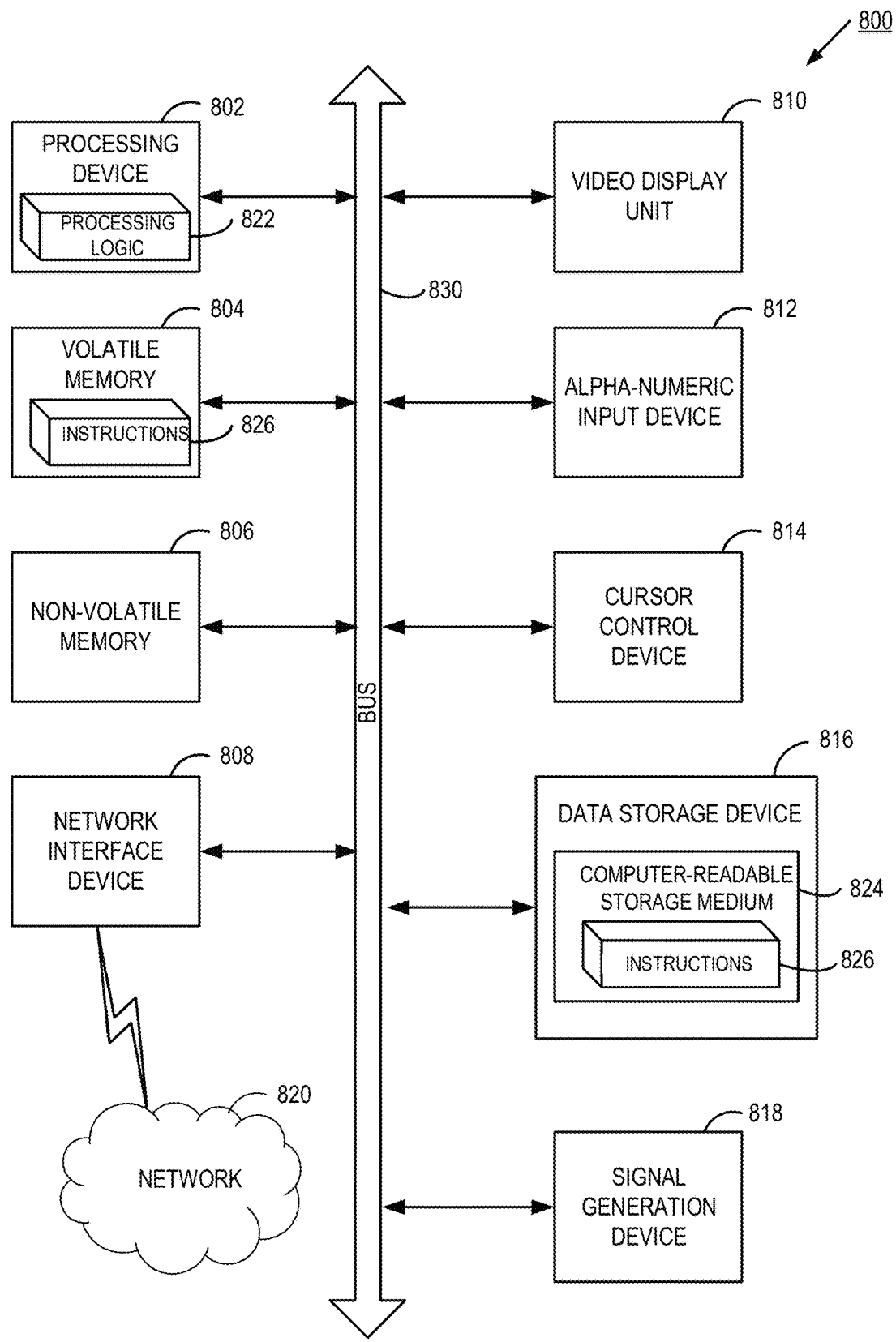
FIG. 8 is a block diagram illustrating an exemplary computer system, in accordance with implementations of the present disclosure.

FIG. 8 is a block diagram illustrating an exemplary computer system 800, in accordance with implementations of the present disclosure. The computer system 800 can correspond to platform 120 and/or client devices 102A-N, described with respect to FIG. 1. Computer system 800 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 840.

Processor (processing device) 802 represents one or more general-purpose processing devices such as a microprocessor, central processing unit, or the like. More particularly, the processor 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 802 is configured to execute instructions 805 (e.g., improving precision of content matching systems at a platform) for performing the operations discussed herein.

The computer system 800 can further include a network interface device 808. The computer system 800 also can include a video display unit 810 (e.g., a liquid crystal display (LCD) or a cathode ray tube (CRT)), an input device 812 (e.g., a keyboard, and alphanumeric keyboard, a motion sensing input device, touch screen), a cursor control device 814 (e.g., a mouse), and a signal generation device 820 (e.g., a speaker).

The data storage device 818 can include a non-transitory machine-readable storage medium 824 (also computer-readable storage medium) on which is stored one or more sets of instructions 805 (e.g., improving precision of content matching systems at a platform) embodying any one or more of the methodologies or functions described herein. The instructions can also reside, completely or at least partially, within the main memory 804 and/or within the processor 802 during execution thereof by the computer system 800, the main memory 804 and the processor 802 also constituting machine-readable storage media. The instructions can further be transmitted or received over a network 830 via the network interface device 808.

In one implementation, the instructions 805 include instructions for providing fine-grained version histories of electronic documents at a platform. While the computer-readable storage medium 824 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/ or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
   obtaining a set of candidate matches for a media item of a platform, wherein each of the set of candidate matches indicates a respective reference media item including a content segment that corresponds to at least one content segment of the media item;
   providing similarity data associated with the media item and each reference media item indicated by the set of candidate matches as input to a machine learning model;
   obtaining one or more outputs of the machine learning model, wherein the one or more outputs indicate one or more content categories and, for each content category, a first level of confidence that the media item is associated with the content category, and a second level of confidence that the at least one content segment of the media item matches content of the respective reference media item indicated by the set of candidate matches in view of the content category;
   determining, based on the one or more obtained outputs:
      a content category associated with the media item, and
      whether the at least one content segment of the media item matches the content of the respective reference media item indicated by the set of candidate matches in view of the determined content category; and
   responsive to determining that the at least one content segment of the media item matches the content of the respective referenced media item indicated by the set of candidate matches in view of the determined content category, causing one or more actions to be initiated to prevent one or more users of the platform from accessing the at least one content segment of the media item.

2. The method of claim 1, wherein the machine learning model is trained to predict, based on given similarity data for media items and reference media items at the platform, content of the media items that matches content of the reference media items in view of content categories associated with the media items.

3. The method of claim 1, wherein the similarity data associated with the media item and each of the set of candidate matches indicates a degree of similarity between one or more features of each content segment of the media item and one or more features of each content segment of the reference media item indicated by the respective candidate match of the set of candidate matches.

4. The method of claim 3, wherein the similarity data corresponds to a heat map, wherein each region of the heat map indicates the degree of similarity between a content segment of the media item and an additional content segment of the reference media item indicated by the set of candidate matches.

5. The method of claim 1, wherein determining the content category associated with the media item comprises:
   determining that the first level of confidence associated with the content category satisfies a first confidence criterion.

6. The method of claim 1, wherein determining whether the at least one content segment of the media item matches the content of the respective reference media item indicated by the set of candidate matches in view of the determined content category comprises:
   determining whether the second level of confidence associated with the content category satisfies a second confidence criterion.

7. The method of claim 1, wherein obtaining the set of candidate matches for the media item comprises:
   obtaining feature data associated with the at least one content segment of the media item, wherein the feature data comprises at least one of spectral feature data, temporal feature data, or structural feature data for the at least one content segment;
   providing the obtained feature data as input to an additional machine learning model, wherein the additional machine learning model is trained to predict, in view of feature data for a media item at the platform, content segments of reference media items at the platform that correspond to content segments of the media item;
   obtaining one or more additional outputs from the additional machine learning model, wherein the one or more additional outputs indicate one or more reference media items at the platform and, for each of the one or more reference media items, a third level of confidence that a content segment of the respective reference media item corresponds to a content segment of the media item; and
   selecting a reference media item to be indicated by the set of candidate matches based on the third level of confidence associated with the reference media item.

8. The method of claim 1, further comprising:
   responsive to determining that the at least one content segment of the media item does not match the content of the respective referenced media item, providing the media item, including the at least one content segment, for access to the one or more users of the platform.

9. A system comprising:
   a memory device; and
   a processing device coupled to the memory device, the processing device to perform operations comprising:
      generating training data for a machine learning model, wherein generating the training data comprises:
         identifying a historical media item and one or more historical reference media items of a platform;
         determining a content category associated with the historical media item;
         obtaining historical similarity data associated with the historical media item and each of the one or more historical reference media items;
         generating a training input comprising an indication of the historical media item, an indication of the one or more historical reference media items, and the obtained historical similarity data; and
         generating a target output comprising the content category associated with the historical media item and an indication of whether content of the historical media item matches content of the one or more historical reference media items; and
      providing the training data to train the machine learning model to predict, based on given similarity data for a current media item and one or more current reference media items at the platform, content of the current media item that matches content of the one or more current referenced media items in view of a content category associated with the current media item, wherein the machine learning model is trained on (i) a set of training inputs comprising the training input, and (ii) a set of target outputs comprising the target output.

10. The system of claim 9, wherein the historical similarity data associated with the historical media item and the one or more historical reference media items indicates a degree of similarity between one or more features of each content segment of the historical media item and one or more features of each content segment of the one or more historical reference media items.

11. The system of claim 10, wherein the historical similarity data corresponds to a historical heat map, wherein each region of the historical heat map indicates a degree of similarity between a content segment of the historical media item and an additional content segment a historical reference media item of the one or more historical reference media items.

12. The system of claim 11, wherein generating the training data for the machine learning model comprises:
   identifying one or more regions of the heat map that indicate a higher degree of similarity between one or more content segments of the historical media item and one or more additional content segments of the historical reference media item than other regions of the heat map; and
   extract the one or more portions from the obtained historical similarity data in view of the identified regions.

13. The system of claim 12, wherein the one or more regions are identified in view of at least one of: a number of regions that are associated with a higher degree of similarity than other regions of the heat map, an average distance between the regions that are associated with the higher degree of similarity and a diagonal of the heat map, a number of regions that are associated with a higher degree of similarity than other regions of the heat map and are adjacent to other regions that are associated with a lower degree of similarity than other regions of the heat map, or metadata associated with the diagonal of the heat map.

14. The system of claim 9, wherein determining the content category associated with the historical media item comprises:
   providing an indication of the historical media item as input to an additional machine learning model that is trained to classify content of a given media item; and extracting, from one or more outputs of the machine learning model, a classification of content of the given media item, wherein the content category associated with the historical media item is determined based on the extracted classification of content.

15. The system of claim 9, wherein generating the training data for the machine learning model further comprises:
obtaining historical feature data associated with one or more content segments of the historical media item, wherein the feature data comprises at least one of spectral feature data, temporal feature data, or structural feature data for the one or more content segments;
providing the obtained feature data as input to an additional machine learning model, wherein the additional machine learning model is trained to predict, in view of feature data for a media item at the platform, content segments of reference media items at the platform that correspond to content segments of the media item; and
obtaining one or more outputs from the additional machine learning model, wherein the one or more additional outputs indicate one or more historical reference media items at the platform and, for each of the one or more historical reference media items, a level of confidence that a content segment of the respective historical reference media item corresponds to a content segment of the historical media item; and
extracting the one or more historical reference media items from the one or more additional outputs in view of the level of confidence associated with each of the one or more historical reference media items.

16. A non-transitory computer readable storage medium comprising instructions for a server that, when executed by a processing device, cause the processing device to perform operations comprising:
obtaining a set of candidate matches for a media item of a platform, wherein each of the set of candidate matches indicates a respective reference media item including a content segment that corresponds to at least one content segment of the media item;
providing similarity data associated with the media item and each of the set of candidate matches as input to a machine learning model, wherein the machine learning model is trained to predict, based on given similarity data for media items and reference media items at the platform, content of the media items that matches content of the reference media items in view of content categories associated with the media items;
obtaining one or more outputs of the machine learning model, wherein the one or more outputs indicate one or more content categories and, for each content category, a first level of confidence that the media item is associated with the content category, and a second level of confidence that the at least one content segment of the media item matches content of the respective reference media item indicated by the set of candidate matches in view of the content category;
determining, based on the one or more obtained outputs:
a content category associated with the media item, and
whether the at least one content segment of the media item matches the content of the respective reference media item indicated by the set of candidate matches in view of the determined content category; and
responsive to determining that the at least one content segment of the media item matches the content of the respective referenced media item indicated by the set of candidate matches in view of the determined content category, causing one or more actions to be initiated to prevent one or more users of the platform from accessing the at least one content segment of the media item.

17. The non-transitory computer readable storage medium of claim 16, wherein the machine learning model is trained to predict, based on given similarity data for media items and reference media items at the platform, content of the media items that matches content of the reference media items in view of content categories associated with the media items.

18. The non-transitory computer readable storage medium of claim 16, wherein the similarity data associated with the media item and each of the set of candidate matches indicates a degree of similarity between one or more features of each content segment of the media item and one or more features of each content segment of the reference media item indicated by the respective candidate match of the set of candidate matches.

19. The non-transitory computer readable storage medium of claim 17, wherein the similarity data corresponds to a heat map, wherein each region of the heat map indicates the degree of similarity between a content segment of the media item and an additional content segment of the reference media item indicated by the set of candidate matches.

20. The non-transitory computer readable storage medium of claim 16, wherein determining the content category associated with the media item comprises:
determining that the first level of confidence associated with the content category satisfies a first confidence criterion.

* * * * *